A. B. ROVER.
CONTROL MECHANISM FOR HYDRAULIC ELEVATORS.
APPLICATION FILED NOV. 2, 1916.
1,307,756.
Patented June 24, 1919.
6 SHEETS—SHEET 1.
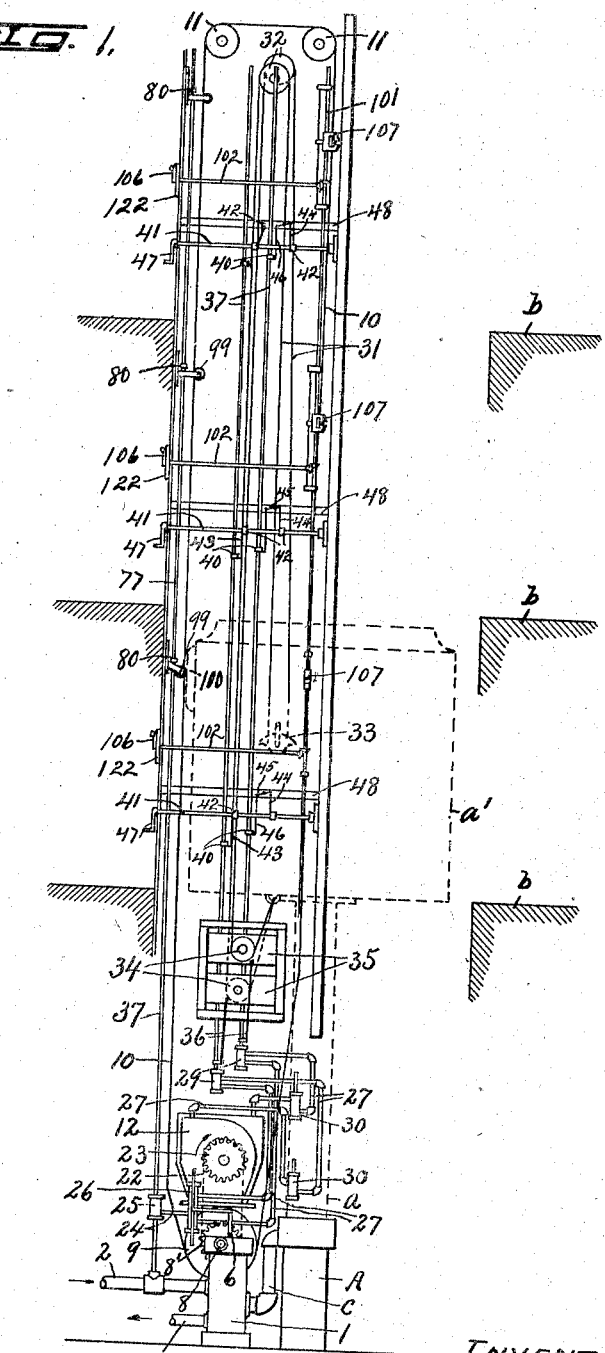
WITNESSES:
INVENTOR
BY
ATTORNEY

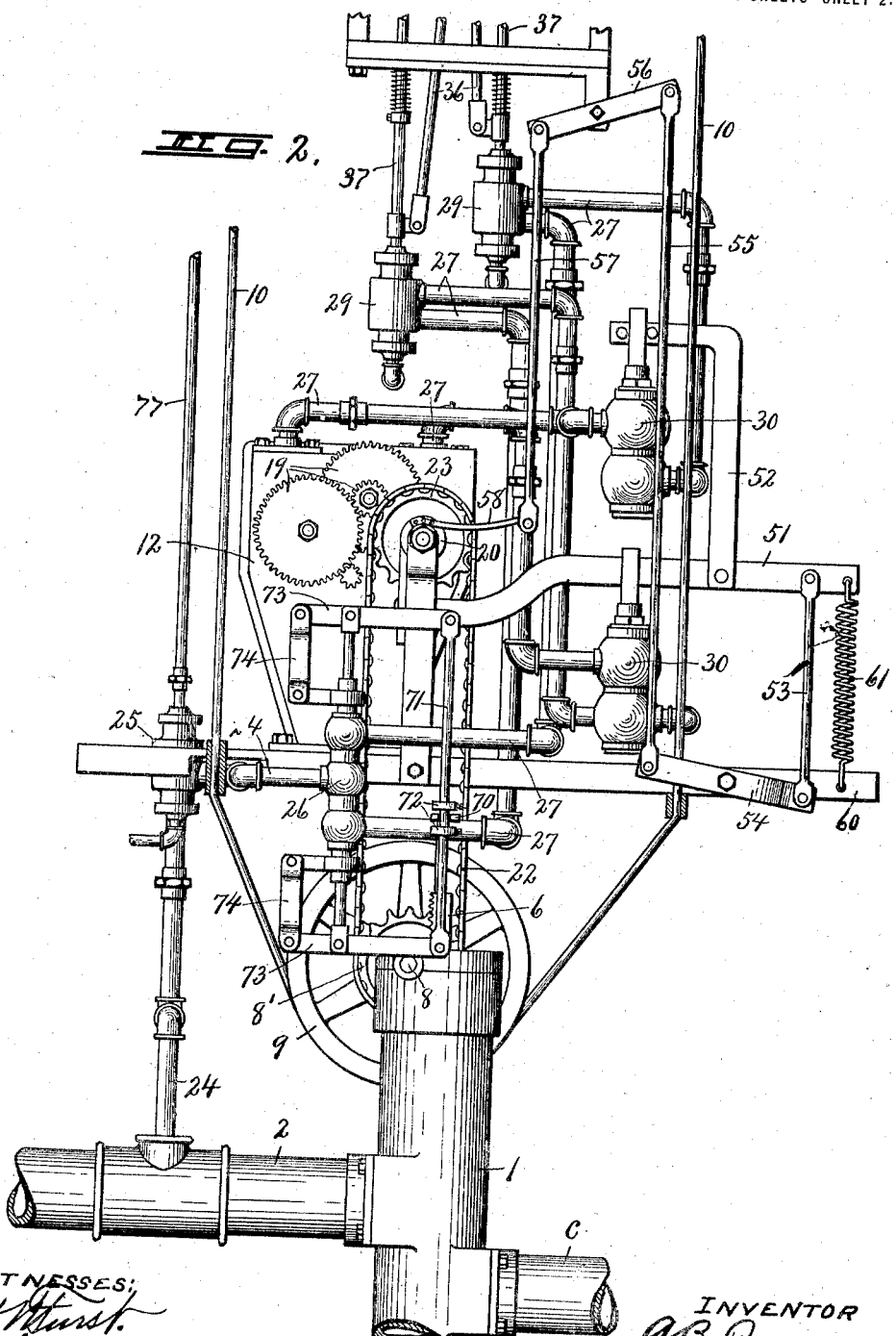

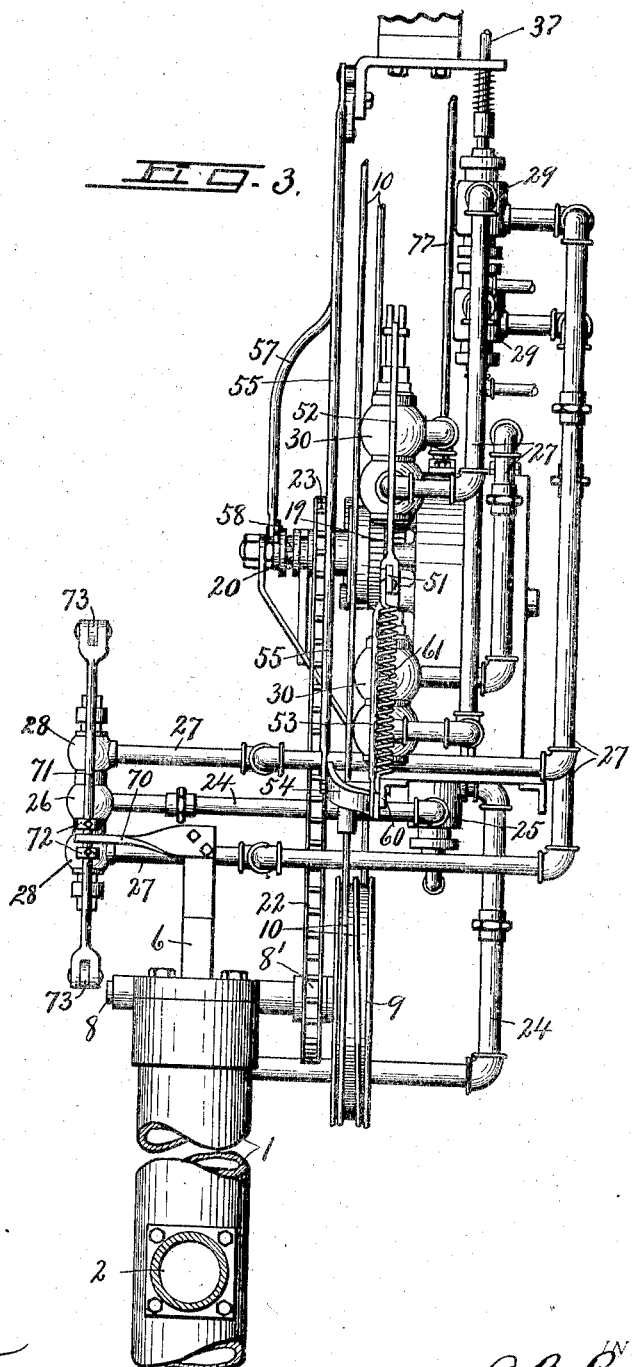

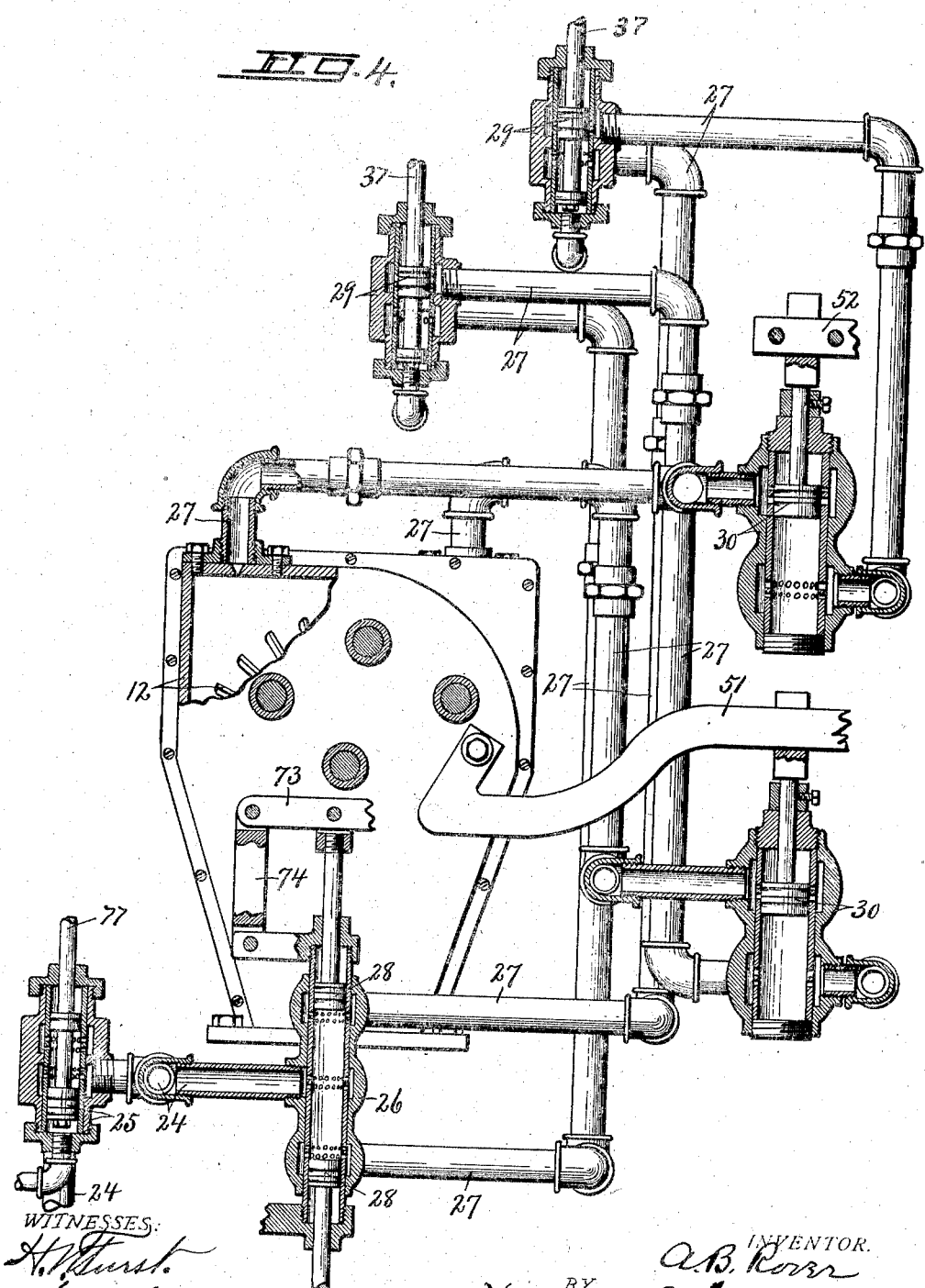

A. B. ROVER.
CONTROL MECHANISM FOR HYDRAULIC ELEVATORS.
APPLICATION FILED NOV. 2, 1916.
1,307,756.
Patented June 24, 1919.
6 SHEETS—SHEET 5.
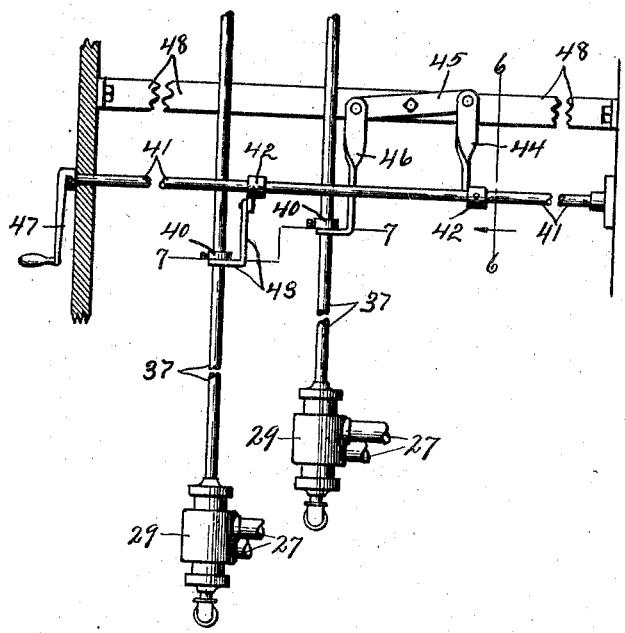
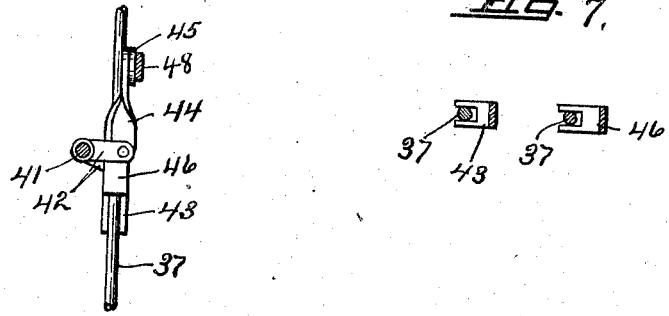

A. B. ROVER.
CONTROL MECHANISM FOR HYDRAULIC ELEVATORS.
APPLICATION FILED NOV. 2, 1916.
1,307,756.
Patented June 24, 1919.
6 SHEETS—SHEET 6.
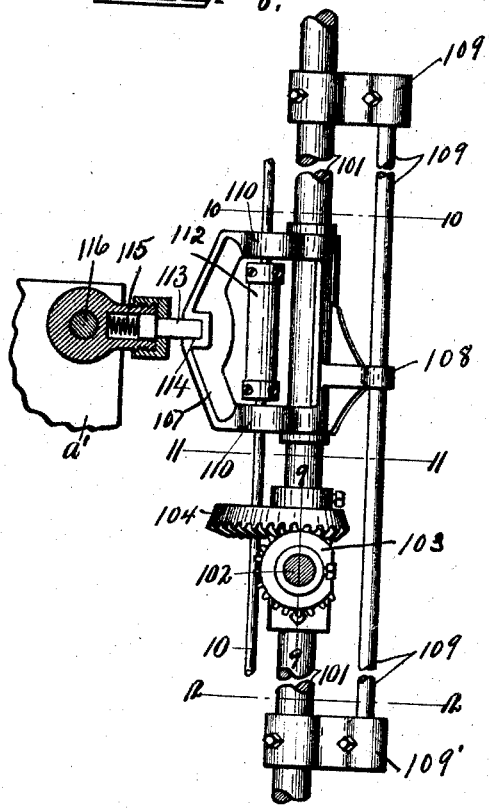
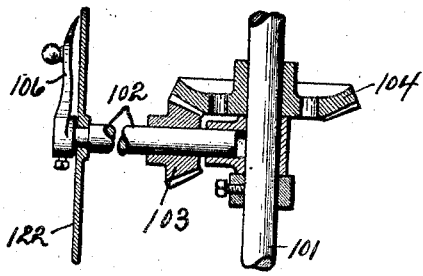
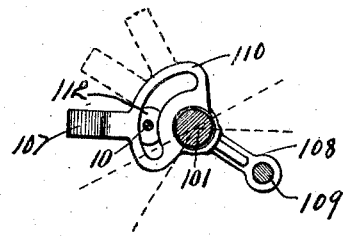
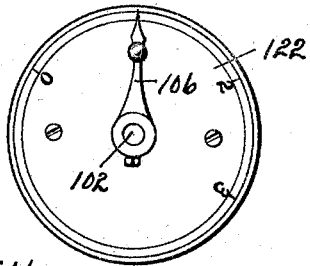
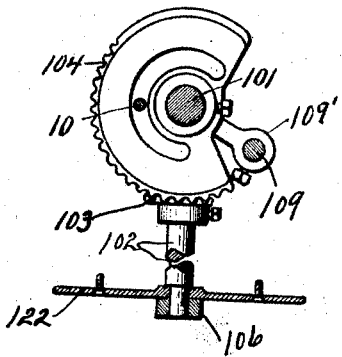
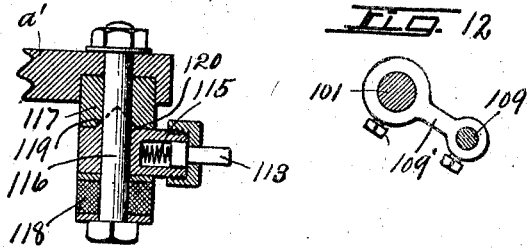
WITNESSES:
INVENTOR.
BY
ATTORNEY.

UNITED STATES PATENT OFFICE.

ADOLPH B. ROVER, OF BINGHAMTON, NEW YORK, ASSIGNOR OF ONE-HALF TO GEORGE A. REYNOLDS AND SAMUEL W. REYNOLDS, BOTH OF BINGHAMTON, NEW YORK.

CONTROL MECHANISM FOR HYDRAULIC ELEVATORS.

1,307,756.  Specification of Letters Patent.  Patented June 24, 1919.

Original application filed December 27, 1912, Serial No. 738,900. Divided and this application filed November 2, 1916. Serial No. 129,095.

*To all whom it may concern:*

Be it known that I, ADOLPH B. ROVER, a citizen of the United States of America, and resident of Binghamton, in the county of Broome, in the State of New York, have invented new and useful Improvements in Control Mechanism for Hydraulic Elevators, of which the following, taken in connection with the accompanying drawings, is a full, clear, and exact description.

This invention relates to certain improvements in hydraulic elevators of the class set forth in my Patents Nos. 1,206,763 and 1,206,764, both issued November 28, 1916, except that it refers more particularly to external mechanism for controlling the operation of the car through the medium of an auxiliary controller which forms the subjects-matter of those two applications, the present application being a division of my parent application, resulting in Patent No. 1,206,763, above referred to.

The main object is to provide means external to the car by which said car may be started at will from and automatically stopped at any one of the several floors through which it is adapted to pass, and at the same time to utilize the automatic stopping mechanism for restoring and maintaining the car at the floor level at which it has been stopped in case it should tend to settle under its own weight or until the stop mechanism is voluntarily released from its holding position.

Another object is to prevent the operation of the car starting mechanism in case the door on any one of the floors leading to the elevator shaft should be open.

A further object is to provide means controlled by the primary starting valve for locking all of the doors in their closed positions, except that corresponding to the floor with which the car may be registered.

A still further object is to provide means controlled by the car for automatically releasing the door-locking means when the car is registered with the corresponding floor.

Other objects and uses will be brought out in the following description.

In the drawings—

Figure 1 is an elevation, partly diagrammatic, of an hydraulic lift or elevator system including the controlling mechanism forming the subject-matter of my present invention, the car and piston being shown by dotted lines, while the several floors are indicated in section.

Figs. 2 and 3 are enlarged side and front elevations, respectively, of the lower portion of the operating and controlling means for the main controller.

Fig. 4 is a still further enlarged side elevation, partly in section, of the reversing motor and the system of pipes and valves controlling the flow of the operating fluid thereto.

Fig. 5 is an inner face view of the upper set of motor-controlling valves shown in Fig. 1, together with the means for operating said valves from one of the floors independently of the controlling means within the car.

Figs. 6 and 7 are detail sectional views taken, respectively, on lines 6—6 and 7—7, Fig. 5.

Fig. 8 is an elevation, partly in section, of the automatic car-stopping device for stopping and holding the car at any predetermined floor, a portion of the car being shown in elevation with a locking bolt thereon.

Figs. 9, 10, 11 and 12 are detail sectional views, taken respectively, on lines 9—9, 10—10, 11—11 and 12—12, Fig. 8, except that the dial and index finger for indicating the floor at which the car is stopped, shown in Figs. 9 and 11, is omitted.

Fig. 13 is a face view of the dial and index finger shown in Figs. 9 and 11.

Fig. 14 is a horizontal sectional view through a portion of the locking device shown in Fig. 8, and adjacent portion of the car upon which it is mounted.

In order that my invention may be clearly understood, I have shown a portion of an hydraulic lift or elevator comprising a cylinder —A— having vertically movable piston —$a$— carrying at its upper end a car —$a'$—, which, together with the piston —$a$—, are shown by dotted lines in Fig. 1, as movable in an opening or well through any one or more of the floors —$b$— of a building.

The cylinder —A— is connected in the usual manner by a pipe —$c$— to a main controlling valve —1— having an inlet pipe —2— and a relief pipe —3— for controlling the flow of the motive fluid to and from the cylinder.

The main valve is provided with an upwardly extending toothed rack —6— meshing with a pinion, not shown, on a rotary shaft —8— which is journaled in the upper end of the main valve case and is provided with an external drum —9— and a sprocket wheel —8'—, either of which may be employed in a manner hereinafter described for operating the main valve.

An endless cable —10— is extended vertically through the elevator shaft and has its lower portion wound with one or more turns around the drum and its upper portion supported by suitable sheaves —11—, preferably at the top of the elevator shaft so that the opposite sides will be disposed in substantially parallel vertical lines.

The main controlling valve is preferably operated through the medium of an auxiliary hydraulic controller forming the subject matter of my Patent No. 1,206,763, previously referred to, and consisting, in this instance, of a reversing water motor —12— having its rotor connected through the medium of a gear train —19— and clutch —20— to a sprocket wheel —23— which in turn is connected by a link belt —22— to the sprocket wheel —8'— so that when the sections of the clutch are engaged, the main valve will be raised or lowered according to the direction of movement of the rotary element of the motor.

The fluid for operating the motor is supplied through a pipe —24— leading, in this instance, from the inlet pipe —2— of the main valve —1— through a normally open primary valve —25— to a valve case —26—, the valve chambers of the case —26— being connected by separate branch pipes —27— to the motor —12— at opposite sides of the axis of the rotor for operating said rotor in in one direction or the other according to the position of the valves —28— in the case —26—.

Connected in each of the branch pipes —27— is a normally closed motor-controlling valve —29— and a piston motor or hydraulic jack —30—, each jack being connected in its branch —27— between the corresponding valve —29— and motor —12— for controlling the operation of the clutch —20—, and thereby controlling the transmission of motion from the motor to the main valve in a manner hereinafter described.

The pistons of the hydraulic jacks —30— are normally positioned to close communication between their respective valves —29— and motor, but when either of the valves —29— is opened the motive fluid is admitted to the corresponding jack, thereby operating its piston to open communication between said valve and the motor for operating the rotor in one direction.

The means for transmitting motion from the hydraulic jacks —30— to the clutch —20— consists, in this instance, of a lever —51— pivoted to the motor case and resting upon the outer end of the piston rod of one of the jacks and provided with a pivoted link —52— which rests in a similar manner upon the upper end of the piston rod of the other jack, as shown more clearly in Fig. 2, the lever —51— being connected by a retracting spring —61— to a stationary support, as —60—, for yieldingly holding the pistons of the hydraulic jacks —30— in their normal positions.

The lever —51— is connected by a link —53— to a centrally pivoted lever —54— which in turn is connected by a link —55— to one end of a superposed centrally pivoted lever —56— having its opposite end connected by a link —57— to a clutch-operating lever —58—.

This clutch is normally released to break the driving connection between the motor and main valve, but it is now evident that when either of the motor-controlling valves —29— is opened, while the primary valve —25— and secondary valves —28— are in their normal open positions, the motive fluid will be admitted to the corresponding jack —30—, thereby elevating its piston to first throw the clutch —20— into operative position and then to open communication with the corresponding side of the motor for driving the rotor to open the main valve and thereby establish communication between the cylinder —A— and either the inlet —2— or relief port —3— according to the direction in which it is desired to move the elevator.

Suitable means is provided for operating the valves —29— from within the car, said means consisting, in this instance, of a cable —31— supported near the top of the elevator shaft by sheaves —32— and having a portion thereof extending into the car and suitably connected to a hand-operated controller —33—, the opposite sides of the cable being extended downwardly around suitable idlers —34— on the movable members —35— of an equalizer and attached to the under side of the car while the members —35— are connected by cords —36— to the stems of the valves —29—, so that when the controller —33— is moved from its normal position in one direction, it will open one of the valves —29—, and when moved in the opposite direction will open the other valve —29—, the opening of either valve causing the operation of the motor and main valve actuated thereby for moving the car as may be desired according to the direction of movement of the controller —33—.

*Automatic stop mechanism for motor and main valve.*

Suitable means is provided for limiting the movement of the main valve and motor when once set in motion by the opening of either of the valves —29—, and for this purpose the stems of the secondary valves —28— are extended through opposite ends of the valve case —26— and pivotally connected to suitable levers —73— which are flexibly connected at one end to stationary portions of the valve case —26— by links —74—, while their opposite ends are pivotally connected to opposite ends of a vertically movable rod —71— having adjustable shoulders or collars —72— thereon for receiving between them a forked arm —70— on the upper end of the stem —6— of the main valve —1— so that as the main valve is shifted in either direction to cause the operation of the car, it will cause a corresponding movement of the rod —71— in the same direction to close the valve —28— of the branch —27— corresponding to the previously opened valve —29—, thereby cutting off the supply of the motive fluid to the motor to stop further rotation of the same, and also causing the stoppage of the further movement of the main valve while the latter is still open to permit the elevator to continue its movement.

The car may be stopped at any desired destination by simply reversing the controlling member —33— in the car to its other extreme position, by which operation the previously opened valve —29— will be closed and its companion valve opened, thereby causing a reverse operation of the motor and consequent restoration of the main valve to its closed position, and at the same time restoring the valves —28— to their normal positions, at which time the car will be stopped and the operator will then instantly return the controlling member —33— to its neutral position for closing the valve —29— last opened, thus stopping the motor.

I have thus far briefly described the auxiliary hydraulic means for operating the main controlling valve as used in connection with the controller within the car in order that the remaining features of my invention used in connection therewith may be more clearly understood.

*Externally controlled starting and stopping device.*

Suitable external means is provided whereby either of the valves —29— may be opened from any one of the several floors of the building independently of the controller —33— within the car for causing the operation of said car through the medium of the motor and main valve, and for this purpose the valve rods —37— are extended vertically through or adjacent to the elevator shaft and are provided at the several floors or stories with adjustable shoulders or collars —40— which are held in their adjusted positions by set screws and are adapted to be engaged by separate operating mechanisms, one at each floor for raising or opening the valves —29— one at a time from their normal closed positions.

Each of these valve-operating mechanisms preferably comprises a horizontal rock shaft —41— suitably mounted in or upon the walls of the elevator shaft in proximity to the upwardly extending valve rods —37— which rock shaft is provided with a pair of crank arms —42— projecting from the same side thereof, one of which carries a forked link —43— engaging the under side of the corresponding shoulder —40— of one of the valve rods —37—, while the other crank arm is connected by a link —44— to one end of a centrally pivoted lever —45— on a stationary portion —48— of the frame of the elevator shaft, the opposite end of said lever being provided with a forked link —46— engaging the under side of the shoulder —40 on the other valve rod —37—.

These rock shafts —41— preferably extend to the exterior of the elevator shaft at the several floors or stories of the building within easy reaching distance of the operator and are provided on their outer ends with suitable operating levers —47— by which they may be rotated in reverse directions from a normal position, or such position as will allow the valves —29— to close by the weight of their respective rods —37—, the connections between each rock shaft and the valve rods being such that when the hand lever —47— is rocked in one direction it will open one of the valves without disturbing the other valve, and when rocked in the opposite direction will open the other valve without disturbing the first-named valve with the result that the opened valve will cause the operation of the motor to shift the main valve from its neutral position, and thereby allow the motive fluid to operate the car in the desired direction.

It is now clear that the effect of opening and closing either of the valves —29— by the external controller —47— is substantially the same as that described for the internal controller —33—, in that its movement in one direction causes the car to ascend and in the reverse direction to descend, and that when it is desired to stop the car at a predetermined destination or floor, it is simply necessary to reverse the operation of the lever from one extreme position to the other, and then to return it to neutral or normal position when the car comes to a stop in the manner previously explained.

*External floor-selecting and car-stopping device.*

Suitable means is provided whereby the operator at any one of the several floors may cause the car to automatically stop at the same or any other predetermined floor and to remain in registration with such floor until the locking device is voluntarily released, said means consisting, in this instance, of a vertical rock shaft —101— extending through the several floors in proximity to one side of the cable —10—, and supporting a series of keepers —107—, one for each story or floor, splined or otherwise feathered thereon for axial and rocking movement therewith, each keeper being provided with a radially projecting apertured lug —108— for receiving a spline or guide rod —109— having its ends secured to suitable brackets —109'— which are adjustably secured by set screws to the rock shaft —101— at opposite ends of the keeper —107— with sufficient clearance to allow the keeper to move a limited distance along and upon said shaft and guide rod.

The guide rods —109— and their supporting brackets —109'— constitute means for carrying the keepers rotarily about the axis of the rock shaft —101— and also for locking the keepers to said shaft to rotate therewith and permit their vertical movement thereon, the several keepers being disposed in different vertical planes about the axis of the rock shaft, and, therefore, at an angle to each other, and being preferably arranged spirally from one end to the other of the series so that by rocking the shaft they may be successively brought into the same plane for automatic interlocking engagement with a locking bolt —113— on the car —a'—, as shown more clearly in Fig. 8.

Each keeper is provided with apertured arms —110— in spaced relation one above the other for receiving the adjacent side of the cable —10— to which are tightly secured a series of stops or abutments —112—, one for each keeper, each stop or abutment being located between the arms —110— with its ends adjacent thereto so that the slightest vertical movement of the keeper in either direction will produce a corresponding movement of the cable and the main-controlling valve —1— operated thereby for restoring the car which may be interlocked with one of the keepers in case such car should shift by settling or otherwise out of registration with the floor at which it may have been stopped.

The outer edge of each keeper is convexed or beveled from its ends toward the center where it is provided with a central recess —114— for receiving the adjacent end of the locking bolt —113— on the car when adjusted into the path of movement of said bolt, so that when the main valve —1— is opened to cause the operation of the car in either direction, the side of the cable —10— carrying the stops —112— will be correspondingly shifted in a direction opposite to that of the movement of the car, and it, therefore, follows that if any one of the keepers is adjusted rotarily into the path of movement of the locking bolt —113— on said car, said bolt will automatically ride against the nearest inclined face of the keeper until it registers with the recess —114— into which it would be forced by a spring —115—, thereby locking the keeper to the car and causing it, together with the adjacent side of the cable —10—, to move therewith until the main valve is restored to its closed position for stopping the car at the predetermined floor at which the corresponding keeper is set.

In order to prevent any possibility of overstraining or breaking the locking bolt or keeper with which it may be interlocked, the bolt is mounted upon a stationary stud or bolt —116— on the car between two coaxial members —117— and —118—, one of which, as the member —118—, consists of a rubber cushion or equivalent yielding device, while the other is provided with a V-shaped cam groove —119— receiving a V-shaped projection —120— on the adjacent side of the locking bolt —113—, so that if the locking bolt is overstrained it will simply turn upon the stud —116—, thereby causing the engaging cam faces to force the locking bolt sidewise along the stud —116— to disengage said locking bolt from the keeper, but it is to be understood that the cushion —118— is sufficiently stiff to cause the locking bolt —113— to carry the keeper with the car when interlocked therewith under ordinary conditions.

Separate devices are provided at each floor for rocking the upright shaft —101— to bring any one of the keepers —107— into the path of movement of the locking bolt —113— on the car, each of said devices comprising a horizontal rock shaft —102— having one end journaled in a yoke on the rock shaft —101— and provided with a pinion —103— meshing with a gear —104— on said rock shaft, and its opposite end extended to the exterior of the elevator shaft within the corridor or hall where it is provided with a hand-lever —106— within easy reaching distance of the operator.

This lever is preferably made in the form of a pointer and is movable around a dial —122— bearing the numbers of the several floors so that by turning the pointer to any one of the numbers, the rock shaft will be correspondingly turned to bring the keeper at the floor corresponding to the number with which the pointer is registered on the dial into the path of movement of the locking bolt —113— on the car so that when the car reaches that particular floor, it will be automatically stopped by the engagement of the locking bolt —113— in the recess —114— in the manner previously described.

The openings in the arms —110— of the keeper through which the cable —10— extends are preferably elongated circumferentially and concentric with the axis of the shaft —101— so as to enable that side of the cable to remain in a substantially straight line as the keepers are shifted rotarily.

*Door and car lock and release.*

As a further protection against accidents, suitable means is provided for preventing the operation of the car in case any one of the several doors leading to the elevator shaft is open and for preventing the opening of any one of the doors except the one corresponding to the floor with which the car is registered, under which conditions such door will be automatically released from its locked position.

For this purpose, the stem, as —77—, of the primary controlling valve —25— is extended vertically through the several floors in proximity to the doors, as —76—, leading to the elevator shaft, and serves, by its own weight, to normally hold said valve open, the stem —77— being provided at intervals with adjustable stops —80—, one for each door, held in their adjusted positions by set screws —81— and normally resting upon the upper faces of the short arms of a series of door-operated levers —78—, as shown more clearly in Fig. 15.

These levers are pivoted at —79— to the frame of the elevator shaft just above their respective doors —76— and are provided with inclined cam portions —83— at one side of their pivots opposite that engaged by the shoulders —80— on the valve stem —77—, said cams being inclined upwardly and extended in the direction of movement of the door.

The door is provided with an upwardly extending arm or bracket —86— carrying a roller —84— which rides upon the upper edge of the lever —78— and is adapted to engage the incline or cam —83— as the door is opened for operating the lever to raise and thereby close the valve —25—, the free end of the lever being guided in a slotted member —82—, thereby cutting off the supply of motive fluid to the auxiliary controller and preventing the operation of the car until the door is closed, which is effected automatically by means of a cord —91— passing over a sheave —92— on the frame of the well and having one end connected to the door and its other end provided with a weight —90—.

Any suitable means may be provided for locking each door in its closed position, said means consisting, in this instance, of a latch lever —87— centrally pivoted at —94— to a plate —89— on the frame of the elevator well, said latch having one end engaged with a keeper —93— on the upper end of the door and its other end engaged with a roller bearing —95— which is engaged by a U-shaped operating member —88— journaled upon the plate —89— and provided with curved cam faces —88'— for releasing the catch —87— from its locking position as said member is rocked in either direction from its normal position.

This rocking member —88— is provided with a radially projecting arm carrying a roller —99— normally disposed in the path of movement of a cam member —100— on the adjacent side of the car —a'—, said cam member —100— and roller —99— being so relatively arranged that the car moving in either direction will automatically operate the tripping member —88— to release the catch —87— from its locking position only when the floor of the car is registered with a floor of the building, the cam being yieldingly held in its normal position by springs —97— to allow the catch —87— to engage its keeper —93—.

When the elevator doors are closed, their corresponding rollers —84— are in close proximity to the low point of the cams —83— of the lever —78—, thus permitting the primary valve —25— to normally remain open, which in turn allows the passage of the motive fluid to the motor when either of the valves —27— is opened for operating the main valve —1— to allow the operation of the car in the manner previously described.

On the other hand, if any one of the doors is wholly or partially open, the long arm of the lever —78— will be depressed by the movement of the roller —84— upon the cam —83—, thus causing the shorter arm of the lever to close the valve —25— and cut off the supply of motive fluid to the motor to prevent any possibility of its operation, or the operation of the car by either the internal controller —33— or the external controller —47— while any one of the doors remains open.

On the other hand, when the doors are all locked and the car is set in motion in either direction, it will cause the release of the door-locking catches successively as it passes through the several floors, but only at the time when the car-floor is registered with the several floors of the building, so that if the car is stopped at any particular floor, the adjacent catch will be held in its released position by the engagement of the cam lock —100— with the roller —99— on the lever —98—, it being understood that as soon as the car passes any particular floor in its movement, the catch will be instantly and automatically returned to its normal holding position.

In order that an operator on any particular floor may start the elevator and cause it to automatically stop at the same or any other floor, it is simply necessary to set the lever —106— into registration with the number on the dial —122—, corresponding to the floor at which the car is to be stopped, by which operation the keeper —107— will be moved into the path of movement of the locking bolt —113— on the car, whereupon the same operator may turn the hand-lever —47— from its normal position to open the proper valve —29— which will cause the operation of the motor and the consequent movement of the car until the locking bolt —113— on the car interlocks in the registering keeper —107— at the floor where the car is to be stopped.

This interlocking movement of the locking bolt with the keeper causes the movement of the cable —10— to restore the main valve to its closed position in the manner previously described, thereby stopping the car at the predetermined floor where it will remain as long as the locking bolt —113— and —keeper —107— are interlocked.

In case the car should tend to settle sufficiently to bring its floor out of registration with the floor of the building at which it was stopped, it would carry the keeper —107— and adjacent side of the cable —10—, thereby again opening the main valve and causing the car to ascend until restored into registration with the floor.

What I claim is:

1. Controlling mechanism for elevators comprising, in combination, a main valve, a water-motor for operating said valve, a supplemental valve normally cutting off the water supply to the motor, means operable from different landings for adjusting the supplemental valve to permit the flow of water to said motor, and means actuated by the main valve for cutting off the water supply to the supplemental valve when the main valve is opened, the first named means being self-restoring and acting to restore the supplemental valve to its normal position when the water supply is cut off therefrom by the second named means.

2. Controlling mechanism for elevators comprising, in combination, a main valve, a reversing water motor for operating said valve, a pair of supplemental valves controlling the water supply to opposite sides of the motor and normally cutting off said supply, self restoring means operable at will from different landings for adjusting either supplemental valve independently of the other to permit the flow of water to the corresponding side of the motor, and means actuated by the main valve when opened by the motor for cutting off the water supply to said supplemental valves, said self restoring means acting to restore the adjusted valve to its normal position when the water supply is cut off thereto.

3. Controlling mechanism for elevators comprising, in combination, a main valve, a water motor for operating said valve, a supplemental valve normally cutting off the water supply to the motor, and means operable from different landings for adjusting the supplemental valve to permit the flow of water to said motor, said means including a rod of sufficient weight to restore the supplemental valve to its normal position when the water supply thereto is cut off.

4. Controlling mechanism for elevators comprising, in combination, a main valve, a rotary reversing water motor for operating said valve, supplemental valves for controlling the water supply to opposite sides of the motor and normally cutting off said supply, means operable at will in reverse directions from one of the landings for adjusting either of the supplemental valves independently of the other to permit the flow of water to the corresponding side of the motor, said means being self-restoring and acting to restore the adjusted valves to their normal positions when the water supply thereto is cut off.

5. Controlling mechanism for elevators comprising, in combination, a main valve, a rotary reversing water motor for operating said valve, supplemental valves for controlling the water supply to opposite sides of the motor and normally cutting off said supply, means operable at will in reverse directions from one of the landings for adjusting either of the supplemental valves independently of the other to permit the flow of water to the corresponding side of the motor, said means being self-restoring and acting to restore the adjusted valves to their normal positions when the water supply thereto is cut off, and means actuated by the main valve when opened for cutting off the water supply to the previously adjusted supplemental valve.

6. Controlling mechanism for elevators comprising, in combination, a main valve, a water motor for operating said valve, a supplemental valve normally cutting off the water supply to the motor, means operable from different landings for adjusting the supplemental valve to permit the flow of water to said motor, and car-operated means for restoring the main valve to its neutral position after the restoration of the first named means.

In witness whereof I have hereunto set my hand this 30th day of October, 1916.

ADOLPH B. ROVER.